United States Patent
Nussbaum

[11] 3,733,161
[45] May 15, 1973

[54] STRUCTURIZER MOLD
[75] Inventor: Frank J. Nussbaum, New York, N.Y.
[73] Assignee: Bischoff Chemical Corporation, Hicksville, N.Y.
[22] Filed: Sept. 15, 1972
[21] Appl. No.: 289,655

Related U.S. Application Data
[63] Continuation-in-part of Ser. No. 884,956, Dec. 15, 1969, abandoned, which is a continuation-in-part of Ser. No. 752,518, Aug. 14, 1968, Pat. No. 3,671,168.

[52] U.S. Cl. .....................425/243, 425/144, 249/80
[51] Int. Cl. ..............................B29f 1/00, B22d 27/04
[58] Field of Search.....................249/78–81, 105; 425/242, 243, 248, 144, 143, 245

[56] References Cited
UNITED STATES PATENTS

| | | | |
|---|---|---|---|
| 2,232,126 | 2/1941 | McWane | 249/80 |
| 2,428,658 | 10/1947 | Falk et al. | 249/79 X |
| 2,591,858 | 4/1952 | Ostendorf | 249/80 |
| 2,717,497 | 9/1955 | Knerr | 249/79 X |
| 3,022,554 | 2/1962 | Burke | 249/105 X |
| 3,124,627 | 3/1964 | Hood | 249/79 X |
| 3,173,175 | 3/1965 | Lemelson | 249/79 X |
| 3,222,725 | 12/1965 | Smith | 425/242 |
| 3,454,988 | 7/1969 | Cremer | 425/407 |
| 2,332,678 | 10/1943 | Tucker | 425/451 |
| 3,671,168 | 6/1972 | Nussbaum | 425/242 |

Primary Examiner—J. Spencer Overholser
Assistant Examiner—Michael O. Sutton
Attorney—John R. Ewbank

[57] ABSTRACT

Each of the two sections of a separable mold for a giant plastic article includes a box having a contoured wall as one end face. The giant article is molded in the cavity defined by the pair of contoured walls. Each contoured wall is thin, heat conductive, and of low specific heat. A plurality of conduits on the rear face of each contoured wall direct the flow of heat transfer fluid to regulate the temperature of a zone of the contoured wall. A relatively high density cellular polyurethane serves as an insulating foundation between the rear face of a contoured wall and the plate of the box and also provides support for the contoured wall. A relatively thin layer of silicone rubber or like material is provided between the cellular polyurethane and each contoured wall. The contoured wall can undergo thermal expansion or contraction throughout or in selected zones without losing its bond to such cellular foundation. Floating connectors associate the contoured walls with frame members of the box, whereby relative thermal expansion of the box independently of the contoured wall is possible.

3 Claims, 2 Drawing Figures

PATENTED MAY 15 1973　　3,733,161

STRUCTURIZER MOLD

OTHER APPLICATIONS

This application is a continuation-in-part of Nussbaum Ser. No. 884,956 filed Dec. 15, 1969, now abandoned, which was a continuation-in-part of Ser. No. 752,518 filed Aug. 14, 1968, (published as U.S. Pat. No. 3,671,168 on June 20, 1972) and all the disclosure of the ancestor applications is deemed here reiterated.

FIELD OF INVENTION

The present invention is directed to a structurizer mold for giant plastic articles wherein the molding is performed at relatively low pressures which may be less than 1000 psi.

PRIOR ART

The marginal cost for preparing additional articles by conventional high pressure injection molding is among the cheapest methods of mass producing plastic articles. Unfortunately, the costs connected with fabrication of molds, start-up labor, and other engineering factors make the average cost per article relatively high on short runs of conventional high pressure injection molding. The quantity of raw material, and thus the raw material cost per article, can sometimes be reduced by the use of cellular plastics. Of particular importance is the possibility of filling a mold at a pressure lower than in conventional injection molding by exploiting the lower viscosity achieved by the use of cellular plastic. Molds adapted to withstand a smaller pressure can be constructed for a lower cost than molds designed for conventional high pressure injection molding of non-cellular plastic. An important advantage of low pressure injection molding of cellular plastic concerns the lower cost of molds and the lower cost of presses attributable to the lower clamping pressure.

Small molds can undergo thermal expansion and contraction without having cumulative changes of dimensions which are beyond the normal engineering tolerances. The cumulative dimensional changes by thermal expansion for molds for giant articles are so great that completely different approaches are necessary for coping with the thermal expansion problems. Plastic articles weighing more than about five pounds are treated as giant plastic articles to distinguish them from conventional injection molded plastic articles weighing a few ounces.

A mold must perform four basic functions. A mold must enclose a cavity to impart a contour or shape to the article being produced. A mold must permit heating and cooling of the cavity. A mold must provide support for the cavity contour so that forces as a result of the injection of material into the mold may be supported. A mold must provided with means for supporting the clamping pressure.

SUMMARY

In accordance with the present invention, a mold for a giant plastic article has a pair of cooperating separable sections, each section consisting essentially of a plurality of frame members adapted to withstand the clamping pressures of a molding press, a box formed by a plate and said frame members, a relatively thin metallic contoured wall, a plurality of independent conduits for heat transfer fluid of controlled temperature, said conduits being in heat transfer relationship to the rear face of the contoured wall for controlling the temperature of a zone of the cavity, and a cellular insulating foundation between the plate of the box and the rear face of the contoured wall for supporting pressures exerted against the contoured wall.

For the purpose of illustrating the invention, there is shown in the drawings a form which is presently preferred; it being understood, however, that this invention is not limited to the precise arrangements and instrumentalities shown.

DESCRIPTION OF AN EMBODIMENT

Figure 1:
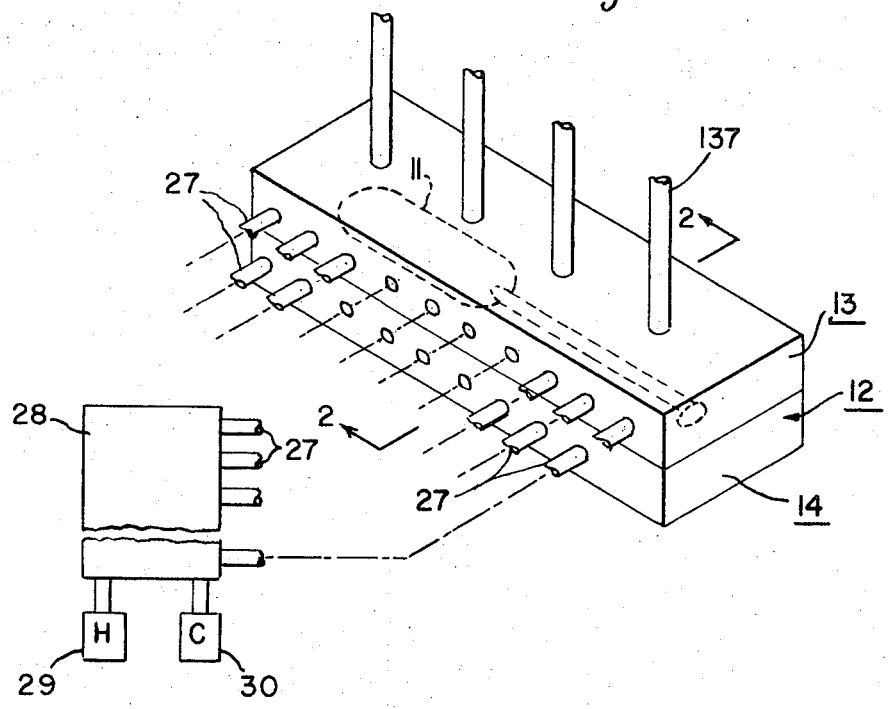
FIG. 1 is a schematic view of a structurizer mold for a paddle.
Figure 2:
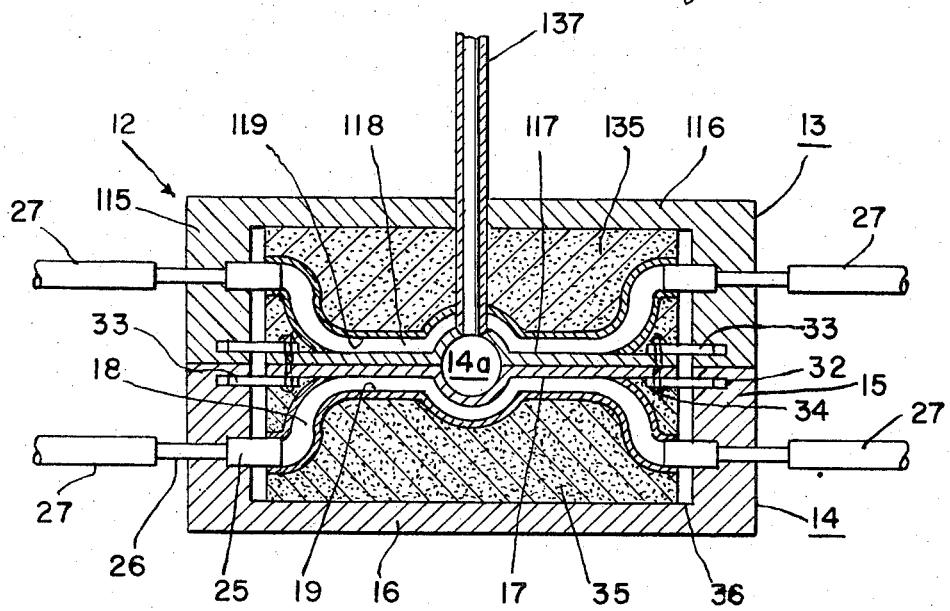
FIG. 2 is a sectional view taken on 2—2 of FIG. 1.

Referring now to the drawing in detail, there is shown in FIG. 1 a paddle. The paddle is one example of a giant article weighing more than about five pounds. The paddle can be manufactured in a structurizer mold 12 comprising a fixed section 13 and a reciprocatable section 14. The mold is suitable for use in a reciprocating molding press. When the press is closed, the sections 13 and 14 cooperate to define a cavity 14a. The paddle is manufactured by the hardening of molten plastic which has flowed into such cavity.

The reciprocatable lower section 14 includes rectangular frame member 15 having the strength to withstand clamping pressures. A plate 16 cooperates with the frame member 15 to provide an open box. In fixed section 13, the frame member and plate are identified as 115 and 116 respectively, and the same pattern of numbering components of section 13 as 100 greater than the corresponding parts of section 14 is followed throughout the description.

A contoured wall 17 is a thin metal shaped wall having depressions defining a part of the cavity and cooperating with contoured wall 117 to define the cavity 14a in which the paddle is molded. As explained in Nussbaum U.S. Pat. No. 3,671,168, the contoured wall 17 is of relatively low specific heat, whereby heat transfer is more efficient and whereby temperature changes are more readily effected. The contoured wall 17 is relatively thin compared to the frame member 15.

The contoured wall may be obtained by electroforming an envelope of thin metal about a master and thereafter constructing the mold sections on opposite faces of the electroform.

On the rear face (i.3. the face opposite the cavity-forming side) of the contoured wall 17 are a plurality of independent heat transfer conduits 18. Heat transfer fluid, ordinarily liquid heat transfer media, is pumped through conduits 18. A tube 25 connects a conduit 18 with a tube 26 which is in a passageway through a frame member 15. The tube 26 extends from the frame and a hose 27 is coupled thereto. Thus, the heat transfer liquid passes through a hose 27, tube 26, tube 25, and through the conduit 18, thereby urging the contoured wall 17 toward the temperature of the heat transfer liquid, and then out through a tube 25, tube 26 and hose 27.

A valve controlling apparatus 28 actuates the valves for the flow of heat transfer fluid to and from the hoses 27 and to and from a heating system 29 and a cooling system 30. Thus, the valve controlling apparatus 28 can provide hot or cold heat transfer fluid to selected conduits 18 in response to whatever programming is desired. The internal structure of a giant article may be modified by appropriate programming of the flow of heat transfer liquid to various zones of the structurizer mold.

The contoured wall 17 is secured to the frame 15 in such a manner that the two structures can undergo thermal expansion or contraction independently of each other. A slot 32 in the frame accommodates a plurality of fingers 33 extending from the contoured wall 17. The frame 15 can be assembled around the contoured wall 17 in one embodiment of the method of assembling the mold, but it is preferred to position the fingers 33 in the slot 32, and then to screw the fingers 33 to the contoured wall 17 with fasteners 34.

An insulating foundation 35 is positioned to fill much of the space between the plate 16 of the box and the rear face of the contoured wall 17. After the contoured wall is positioned by the fingers 33 in the slot 32, and after the hereinafter described steps of shaping the wax rods and applying the silicone rubber to the combination of contoured wall and wax rods, said insulating foundation 35 can be poured in place or it can be prepared in any other manner which provides for compliance with the shape of the rear of the contoured wall 17. It is generally desirable to employ cellular rigid polyurethane for the insulating foundation, but other insulating material could serve. The insulating foundation desirably has about 25% pore volume and sufficient mechanical strength to supplement the support provided by the fingers 33 in positioning the contoured wall 17. The insulating material will be poured in place prior to securing the plate 16 to frame 15. Thereafter the mold halves 17 and 117 will be separated.

The conduits 18 are desirably formed by the lost wax method. Wax rods are pressed onto the rear of the contoured wall and the ends of the rods are bent to permit connection of the conduits 18 with tubes 25. The polyurethane foundation 35 eventually provides much of the strength for conduits 18 and the silicone rubber liner 19 provides a waterproof barrier to protect the insulation from contact with water or other heat transfer liquid. At the zones in which the conduits 18 are in heat transfer relation with the contoured wall, the heat transfer liquid contacts the contoured wall, and the silicone rubber barriers shield the insulating foundation from the heat transfer liquid. The silicone rubber precursor is sprayed onto the exposed portions of the wax rods and the portions of the rear face adjacent such wax rods, forming U-shaped barriers adjacent the contoured wall and circular tubular barriers at the bent connections to the tubes 25. The silicone rubber precursor is cured to provide strong silicone rubber. After the pouring and curing of the polyurethane foundation 35, the wax is melted and removed to provide conduits 18 which are lined with silicone rubber sheet 19 except at contact with the rear face of contoured wall 17. Other precursor compositions curable into a solvent-resistant liner between foundation 35 and conduit 18 might be substituted for silicone rubber.

Similarly, removable wax can be employed to provide a gap 36 between the foundation 35 and the frame 15. The contoured wall 17 can undergo a significant change of dimension as a result of a change of temperature without the temperature being transmitted to the frame. Such change of dimension does not jeopardize the securing of the contoured wall to the box either through the fingers 33 in slot 32 or through the bonding to the foundation 35, which is bonded to the plate 16. The cellular foundation 35 permits rectangular frame 15 and the contoured wall 17 to undergo thermal expansion and contraction independetly of each other.

The structurizer mold 12 permits each of several functions of the mold to be performed efficiently. The shape-imparting function is performed by the contoured walls 17, and 117. The withstanding of the pressure of the clamping action of the molding press is accomplished by the rectangular frames 15, 115 and by plates 16, 116. The foundations 35, 135 can withstand pressure while insulating against rapid transfer of heat. The heat transfer conduits 18, 118 help to control the temperature of the contoured walls 17, 117, and are so insulated that substantially all of the heat transfer occurs at such wall. Because each contoured wall 17, 117 has a low specific heat, the temperature of a particular zone of the mold face rapidly approaches the temperature of the heat transfer fluid on the other side of such zone.

The fixed section 13 of the mold 12 includes the components described in connection with separable section 14. A plurality of nozzles 137 are adapted to inject the mixture of gas and molten plastic into the mold. Because the structurizer mold is for a giant article weighing more than 5 pounds, there are always a plurality of orifices for the inflow of the mixture of hot molten plastic and gas into the structurizer mold.

When the mold is opened, the paddle is removed. Then the mold is closed, and the contoured walls 17 and 117 are brought to preselected temperatures by the liquids flowing through conduits 18 and 118 in response to the programming of valve controlling apparatus 28. Different zones can be programmed differently because each conduit or each group of conduits can have its own set of valves for such independent functioning.

A mixture of gas and molten plastic flows through nozzles 137 during a brief portion of the total molding cycle. The plastic cools sufficiently that the paddle can be removed, and then the cycle is repeated. The speed with which a molding cycle can be completed is significantly affected by the effectiveness of the cooling of the article. The combination of the low specific heat of the contoured walls 17, 117 and the significant cooling capacity of the conduits 18, 118 permits more rapid cooling of the paddle than would be attainable in molds conventionally employed for high pressure injection molding. The insulating foundations 35, 135 and floating pins 33, 133 permit the contoured walls 17, 117 and frame members 15, 115 to expand and contract thermally independently of each other.

The present invention may be embodied in other specific forms without departing from the spirit or essential attributes thereof, and, accordingly reference should be made to the appended claims, rather than to the foregoing specification as indicating the scope of the invention.

The invention claimed is:

1. In an injection mold comprising a plurality of sections separable for the removal of an organic thermoplastic article from a mold cavity, the improvement which consists of:

a frame adapted to withstand clamping pressures in a reciprocating molding press for injection molding of a giant cellular thermoplastic article weighing more than five pounds;

a plate combining with the frame to create an open box;

a thin contoured wall for imparting at least a portion of the desired shape to the mold cavity and to the article, said contoured wall having a relatively low specific heat;

a plurality of independent sets of heat transfer conduits in heat transfer relationship to various zones of the rear of the contoured wall;

a plurality of independent sets of tubes extending from the frame for directing heat transfer fluid to and from the independent sets of heat transfer conduits, whereby programming of differential heat transfer for various zones of the mold is feasible;

a cellular polyurethane thermally insulating foundation filling a significant portion of the box and contacting the contoured wall, heat transfer conduits, and plate;

a second corresponding section comprising a frame, plate, contoured wall, heat transfer conduits, tubes, and insulating foundation, and having orifices for the entry of an injected mixture comprising hot molten organic plastic and gas at a plurality of locations in the mold cavity defined by the two contoured walls, said two sections cooperating to provide a structurizer mold in which the heat transfer characteristics applied to one zone of the cavity can differ from the heat transfer characteristics applied to another zone of the cavity by reason of the independent functioning of the independent sets of heat transfer conduits for the various zones of the structurizer mold.

2. The mold of claim 1 wherein each insulating foundation has a gas volume of about 25 percent, attributable to the cellular structure.

3. The mold of claim 1 including slideable mechanical connections securing each contoured wall to its frame so that each may thermally expand or thermally contract independently of each other.

* * * * *